United States Patent
Maxemchuk (12) 
(10) Patent No.: US 6,411,810 B1
(45) Date of Patent: Jun. 25, 2002

(54) OVERLOAD CONTROL IN A PACKET-SWITCHING CELLULAR ENVIRONMENT

(75) Inventor: Nicholas Frank Maxemchuk, Mountainside, NJ (US)

(73) Assignee: AT&T Corp., Basking Ridge, NJ (US)

( * ) Notice: Subject to any disclaimer, the term of this patent is extended or adjusted under 35 U.S.C. 154(b) by 0 days.

(21) Appl. No.: 09/326,227

(22) Filed: Jun. 4, 1999

Related U.S. Application Data (62) Division of application No. 08/982,571, filed on Dec. 2, 1997.

(51) Int. Cl.[7] .................................................. H04Q 7/20
(52) U.S. Cl. ........................ 455/453; 455/422; 455/466; 370/229; 370/237
(58) Field of Search ................................ 455/422, 428, 455/466, 517, 453; 370/235, 395, 389, 230, 237, 229

(56) References Cited

U.S. PATENT DOCUMENTS

| | | | |
|---|---|---|---|
| 4,797,882 A | | 1/1989 | Maxemchuk |
| 4,974,256 A | * | 11/1990 | Cyr et al. .................... 379/113 |
| 5,142,550 A | * | 8/1992 | Tymes ......................... 455/447 |
| 5,172,414 A | | 12/1992 | Reeds et al. |
| 5,444,707 A | * | 8/1995 | Cerna et al. ................. 370/395 |
| 5,615,255 A | * | 3/1997 | Lemieux ...................... 370/235 |
| 5,857,147 A | * | 1/1999 | Gardner et al. .............. 455/453 |
| 5,970,412 A | * | 10/1999 | Maxemchuk ................ 455/447 |

OTHER PUBLICATIONS

N. F. Maxemchuk, "A Variation on CSMA/CD that Yields Movable TDM Slots in Integrated Voice/Data Local Networks", The Bell System Technical Journal, vol. 61, No. 7, Sep. 1982.

N. F. Maxemchuk, et al, "Voice and Data on a CATV Network", IEEE Journal on Selected Areas in Communications, vol. SAC–3, No. 2, Mar. 1985.

* cited by examiner

*Primary Examiner*—William Trost
*Assistant Examiner*—Simon Nguyen
(74) *Attorney, Agent, or Firm*—Henry T. Brendzel (57) ABSTRACT

An improved cellular arrangement is created with mobile units that are responsive to control signals that direct the mobile units to modify the rate of packet transmissions in case of channel overload. A mobile unit in such an arrangement encodes either the speech signal, or only a portion thereof that is sufficient to reproduce a lower fidelity speech which is still intelligible—and at a lower rate. In another embodiment, the mobile unit creates a second stream of packets, also at a lower rate. The second stream complements the first stream of packets in its lower rate form, to allow reproducing the speech signal with high fidelity. Operationally, such a mobile unit is responsive to a base station which, under overload conditions, directs the mobile unit to transmit packets at the lower rate (and the lower fidelity). Optionally, the base station can also directs the mobile unit to send the second stream of packets over a different channel.

7 Claims, 3 Drawing Sheets

OVERLOAD CONTROL IN A PACKET-SWITCHING CELLULAR ENVIRONMENT

RELATED APPLICATIONS

This application is a divisional application of an application entitled "Overload Control in a Packet-Switching Cellular Environment" filed on Dec. 2, 1997 and bearing the Ser. No. 08/982,571.

BACKGROUND

This invention relates to cellular telephony and, more particularly, to the use of packet techniques in cellular telephony.

The number of people that use cellular telephones is continually increasing. Because the available bandwidth is controlled by governmental regulations, providers of cellular telephony are meeting the increase in users by establishing smaller cell sizes. Smaller cell sizes accommodate larger numbers of mobile units within the same overall bandwidth because smaller cell sizes effectively increase the rate of bandwidth re-use per unit area. However, as cell sizes shrink, mobile units move between cells more frequently. In a circuit switched system, each move requires that one circuit be torn down and another one set up. Consequently, as cell sizes decrease, the work associated with handing off users between cells increases. In addition, when a mobile unit traverses more cells during its connection, it is more likely that the mobile unit will encounter a cell with more units than the bandwidth can support.

Packet switching, as compared to circuit switching, reduces the work required for hand off because addresses embedded within the packets are used to route individual packets rather than setting up and tearing down circuits. Packet switching was used in early military cellular systems. Those networks were designed to be rapidly deployed, were aimed primarily for wireless interconnection between mobile units, and were not connected to a wired backbone network.

Currently, the prevalent commercial cellular system in the United States is a circuit switched arrangement that employs Time Division Multiplexing (TDM). Another system, which is also a circuit switched system, employs Code Division Multiple Access (CDMA). These cellular systems can transmit data in the form of packets, but that does not constitute "packet switching," either in the sense employed in the aforementioned military system or in the sense employed in this disclosure. Specifically, while the data may have a packet format, the switching within the cellular environment is not based on the explicit address information in the packets. For example, in TDM the address is implicit in the frequency and time slot at which the mobile unit operates.

The explicit addressing characteristic of packet switching is more flexible than implicit addressing. With explicit addressing, the capacity on the shared medium can be reassigned as required and the destination can be changed without advance notice. Because of that, it is beneficial to fashion a packet switching approach for cellular communication that interfaces effectively with a wired backbone network.

SUMMARY

An improved cellular arrangement is created with mobile units that are responsive to control signals that direct the mobile units to modify the rate of packet transmissions in case of channel overload. A mobile unit in such an arrangement includes apparatus that, when a speech signal needs to be encoded into a packet stream, encodes either the entire speech signal, or only a portion thereof that is sufficient to reproduce a reduced fidelity speech that is still intelligible. Packets that carry the portion of speech that reproduces the rediced fidelity speech are outputted by the mobile unit at a lower rate than that of packets that carry the entire speech signal.

In another embodiment, the mobile unit includes further apparatus that creates a second stream of packets, and that second stream is transmitted to a base station over a channel that is different from the channel over which the first stream of packets is transmitted. The second stream of packets, also having a lower rate than that of packets that carry the entire speech signal, complements the first stream of packets in its lower rate form, to allow reproducing the speech signal with high fidelity.

Operationally, such a mobile unit is responsive to control signals from the base station. When the base station decides that a primary channel over which the mobile unit is communicating with the base station is too heavily loaded, it sends a command to the mobile unit to transmit packets at the lower rate (and the reduced fidelity). Optionally, the base station can also direct the mobile unit to send the second stream of packets over a different channel, e.g., to a different base station.

DETAILED DESCRIPTION

Structure

Figure 1:
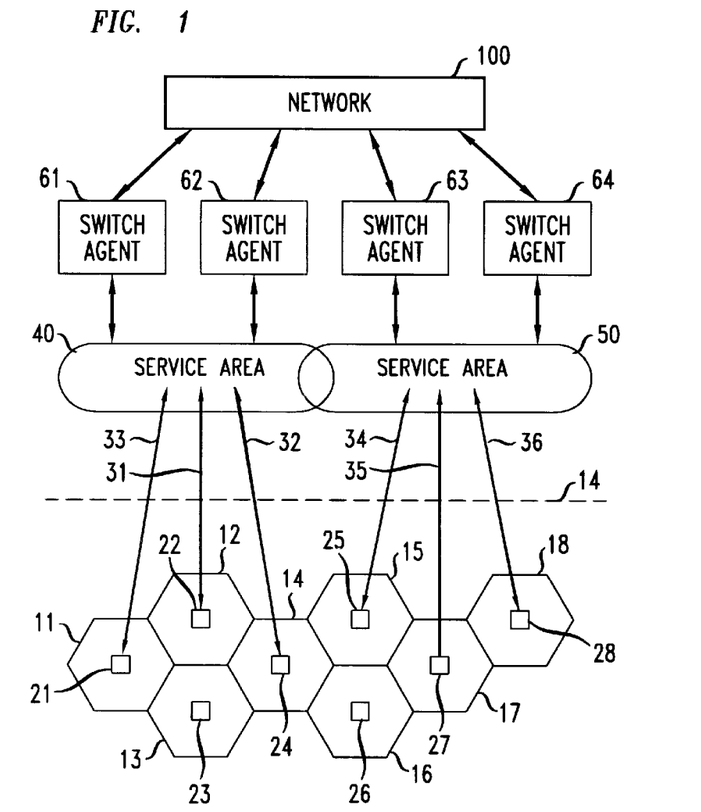
FIG. 1 presents a general block diagram of a system that employs packet switching and switching agents.

FIG. 1 depicts the general structure of a network that includes a wired portion above dashed line 10 and a wireless portion below dashed line 10. The wireless network comprises cells, depicted in the form of hexagons, e.g., hexagons 11–18, which completely cover a given collection of service areas. A service area can span any convenient geography, such as a city, a city and its suburbs, or an area into which people frequently commute. In the center of each cell there is a base station, e.g., element 21, that provides connection between the wireless network and the wired network. Lines 31–36 diagrammatically show this connection. Each switching center that is coupled to base stations connects the base stations with the existing wide-area communications network 100—for instance, the conventional, circuit switched, telephone network, or the Internet.

In accordance with the principles disclosed herein, the coupling between the base stations and the service areas on one side, and network 100 on the other side, is effected through switching agents. Each registered mobile unit is represented by a switching agent at the interface to network 100; for example, agents 61–64. The agent is responsible for translating between the formats that are used in network 100 and the service areas (if necessary), and for all operations needed for mobility.

Service areas 40 and 50 are wired packet switched networks. In addition to other functions, they serve as buffers to remove all responsibility for mobility from network 100. A service area can have any one of a number of different topologies, such as the well-known star, tree, mesh, ring, bus, or regular mesh. All of these networks can support packet switching. Of course, a service area should employ a topology that allows for easy interconnection with adjacent service areas. Moreover, interconnected adjacent areas should be arranged to have a hysteresis at the areas' boundaries. By hysteresis I mean that instead of moving a switching agent to an adjacent service area as soon as the mobile unit arrives at a cell of that adjacent service area, the switching agent is kept in the original service area until the mobile unit moves more deeply into the adjacent service area. This hysteresis reduces processing associated with migration of a switching agent from one service area to another, because at times the mobile unit returns to the original service area. This hysteresis is depicted in FIG. 1 by the overlap between service areas 40 and 50.

The specific architecture, or topology, of the service areas is not important to the broad principles of this invention; but for sake of completeness, it is useful to review the various topologies that are implementable.

One such topology is the star topology, where lines from all of the base stations in a service area terminate at one packet switch (the "central office"). The switching agents are installed between the "central office" of each service area and a switch on the wide-area communications infrastructure 100, say in that "central office". The "central offices" of the various service areas are advantageously interconnected to allow for easy migration of switching agents, e.g. via several lines running between them.

As a mobile unit moves between cells within a service area, the connection through the central office packet switch changes, but the connection on infrastructure 100 remains fixed. A disadvantage of this topology is that there is no redundancy in the connection between the base stations and the central office.

A tree topology is similar to a CATV network, when the "central office" is located at the root, and the cells are located at the leaves of branches. For packets destined to the base stations, routing decisions are made at each branch split in the tree. For traffic destined to the head end, multiplexers combine the packets and send them toward the "central office". An advantage of this approach is that the CATV infrastructure is in place in most parts of the United States, and packet multiplexers and splitters are commercially available. The overlap between service areas can be created by placing a splitter/multiplexer at the trunk of the tree and using the multiplexer to switch a number of connections to an adjacent tree. The principle disadvantage of this architecture is its weak reliability. There are many locations where the failure of a single line or component can disrupt communications for a large number of cells.

A general mesh topology can be implemented by a network of Internet routers between the central office and the base stations. This type of network can be made as reliable as needed by installing redundant lines and routers. Service areas can be interconnected through the routers. The disadvantage of this approach is the expense of locating a router at each cell site. Routers may be used advantageously within the service areas, but a simpler device should be associated with each cell.

Two possible distribution networks that are considerably simpler than routers are the FDDI dual ring network, and the DQDB dual bus network. Both of these networks can survive single failures. The disadvantages of these networks are that it is difficult to interconnect them to create overlapping service areas, and the load per link increases linearly with the number of nodes in the network. The latter characteristic constrains the number of base stations that can be located on the same network.

The two disadvantages associated with FDDI and DQDB networks are overcome by another regular topology, the Manhattan Street Network (MSN), which was disclosed by me in U.S. Pat. No. 4,797,882, issued Jan. 10, 1989. Regular arrays of MSN's can be interconnected into larger regular arrays to construct overlapping service areas. The MSN can also be partitioned into non-interfering, independent, communities of interest, which makes it possible to support arbitrarily large numbers of base stations that do not communicate with one another.

Figure 2:
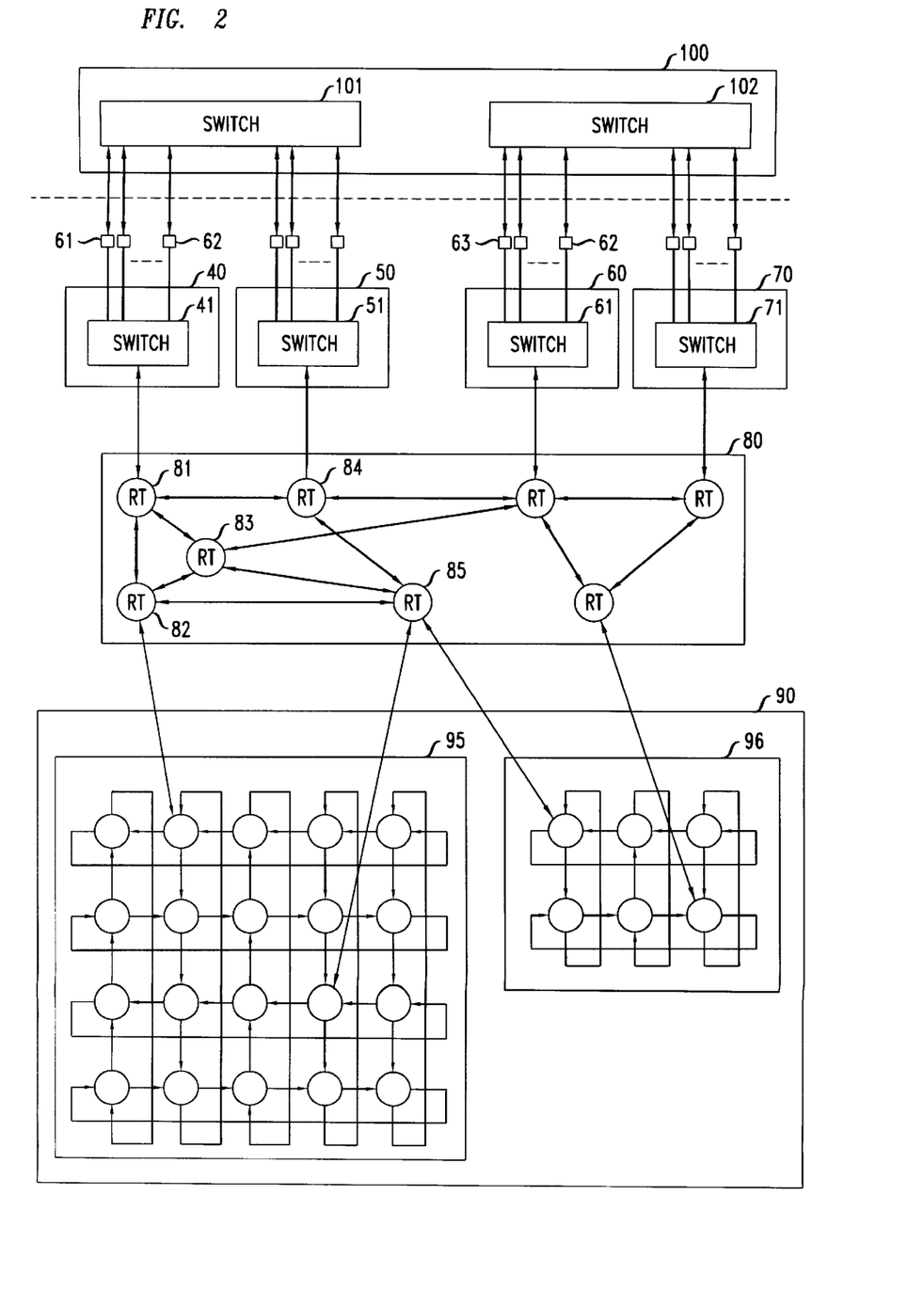
FIG. 2 presents details about an illustrative topology of the structure between the base stations and the switching agents.

Actually, the disadvantages associated with specific technologies are eliminated in the arrangement shown in FIG. 2 by combining several technologies. In FIG. 2, the "central office" switches in each service area, such as switches 41, 51, 61, and 71, concentrate the connections from network 100 to a router. For example, switch 41 has a number of logical connections to switch 101 on one side (by means of the various switching agents) and a physical connection to router 81 on the other side. In the reverse direction, switch 41 fans out the connections from the router to switch 101. Router 81 is but one of a number of routers that make up router network 80. Several service areas (and their associated "central office" switches) are connected to router network 80, and several other connections couple network 80 to distribution network 90. Those connections couple network 80 to neighborhoods of network 90, such as neighborhoods 95 and 96. The connection to each neighborhood is, advantageously, a multiple connection. This eliminates the problem of a single point of failure. Additionally, the routers within network 80 are multiply interconnected for increased connectivity and reliability. The distribution network in FIG. 2 is an MSN network and, as indicated above, it comprises neighborhoods. A service area can have several neighborhoods. As an aside, the functionality of network 90 can subsume that of network 80. Network 80 is depicted to illustrate the fact that different networks can be employed. Indeed, currently the components that make up network 80 are readily available commercially, and the use of network 80 allows network 90 to be smaller.

General Operation

The operation of the FIG. 2 network is quite effective. Each mobile unit that is known to be present in the area (i.e., is registered) has an associated switching agent—which is a software module, or object—at a gateway between a service area and network 100. For convenience, the switching agent resides in a node within a service area, and this disclosure refers to this node as a "central office". Information that needs to be sent by network 100 to a particular mobile unit is transferred to that unit's switching agent. From the switching agent, packets are sent to the mobile unit via a path that comprises the service area's "central office" where the switching agent resides, one or more routers in network 80, and one or more nodes in network 90. Packets that emanate from a particular mobile unit are aimed at its associated switching agent. That is, they conveniently contain an address that identifies the "central office" and the switching agent. They also contain the address of the base station that is to receive the mobile unit's packets. The latter address allows the "central office" to decide whether to migrate the switching agent to another "central office" (thereby realizing the service area hysteresis disclosed above). From the base station, the packets enter an MSN (for example, MSN 95) and then they are passed to a router within network 80, e.g., router 85. Network 80 routes the packets to the switch with which the mobile unit's switching agent associates (e.g., switch 41). All this is done based on the addresses contained in the packets.

Typically, when the mobile unit moves to an adjacent cell, there is no effect on operation other than the fact that the packet enters the MSN network (e.g., network 95) at a different point. On occasion, however, when the mobile unit moves from a cell in one service area into a cell in an adjacent service area (and not into an area where the two service areas overlap), the operation does change. Specifically, the "central office" realizes that the base station, which sent the packets, is far removed from the geographical area that is normally handled by the "central office" and the central office accordingly migrates the switching agent to a new "central office".

In such an event, the connection with network 100 also needs to be changed because network 100 needs to communicate with the switching agent at its new location. When network 100 is a circuit switched network, the existing circuit to the switching agent needs to be torn down, and a new circuit needs to be established pointing to the service area to which the switching agent was moved. When network 100 is a packet network, e.g., Internet, then the accounting for the moved switching agent must be carried out with whatever particular protocol is employed in the network.

When a mobile unit wishes to register itself, it transmits a packet without identifying a destination switching agent. The base station accepts the packet and routes it to a central office that is assigned to the base station. That is, the base station directs the packets to a "central office" onto which it homes. Since the packet does not identify a destination switching agent, the central office creates one (after appropriate service provision tests have been met) and responds to the mobile unit with the switching agent's identity. When a mobile unit wishes to initiate a call, it sends a control packet that causes the switching agent to appropriately engage network 100 to establish the desired connection.

When a call is initiated to a mobile unit that is not registered, there is no switching agent available, and the calling party receives a message to the effect that the mobile unit is not found. When a call is initiated to a mobile unit that is inactive, albeit registered and having an agent, the agent can establish contact with the inactive mobile unit over a common control channel.

Once a contact is established with a mobile unit, the switching agent sends out encapsulated packets (i.e., each being a packet within a packet) to the mobile unit. The outer packet is addressed to a particular cell, or base station, while the inner packet is addressed to a particular mobile unit. The agent needs to change only the address of the outer packet when the mobile unit moves from cell to cell. But, that is a lot less work—one bookkeeping operation—than setting up and tearing down a circuit-switched connection.

Communication to the Base Station

Current cellular systems are basically circuit switched systems. Such systems inherently dedicate a channel to a particular call, and the capacity of that channel is captured by that call whether or not that call actually utilizes the captured capacity. In a sense, this is an inefficiency. The FIGS. 1 and 2 systems are packet systems that use random access techniques. Random access techniques do not inherently assign a particular capacity to a call and therefore have the potential for a more effective utilization of the available bandwidth. However, pure random access techniques—where a mobile unit is allowed to transmit at will—also possess a characteristic that causes inefficiency. Specifically, there is clearly a potential for collision of data when two or more units are transmitting at the same time. Some capacity is used by virtue of the means that are provided to resolve contention over use of the inbound channel, and whatever capacity is so used constitutes inefficiency.

What is interesting about cellular networks as they are developing is the fact that they are shrinking in size. One consequence of the shrinking size is a smaller propagation delay within a cell. The smaller propagation delay makes it possible to use efficient contention detection strategies, such as the Carrier Sense Multiple Access (CSMA) protocol or CSMA with collision detection (CSMA/CD). The latter is the protocol that is used on the Ethernet.

In the CSMA protocol, a mobile unit listens to the transmit-frequency before starting to transmit to determine whether another mobile unit is already using the channel. When the channel is not busy, the mobile unit stops listening and starts transmitting. Because of propagation delays, however, it is possible for different mobile units to find the channel not busy, to start transmitting, and to thus create a collision condition. CSMA/CD overcomes this problem by continuing to listen to the channel even after the mobile unit begins transmitting. Collision is detected by the mobile unit when it finds out that the channel is carrying more than just its own transmission. When a collision is detected, the unit stops transmitting, and tries to retransmit at another (randomly selected) time. Another unit that caused the collision also stops its transmission and also retries to retransmit at a later time.

Identifying the presence of a collision condition requires that a unit detect the presence of a signal from another unit while it transmits on the same frequency and thus also receives its own signal. In a cable environment, that is not too difficult because a properly terminated cable does not produce echoes and therefore the cable unit can easily subtract its own signal from the received signal. Even when echoes exist, they are generally of small magnitude and relatively constant with time, allowing conventional echo cancellation techniques to be used effectively. Collision detection in a radio network, however, is much more difficult because unexpected echoes (reflections) can be much stronger than the signal from other stations. Compensating for reflections in a wireless system requires considerable processing and delay. This is particularly true in a mobile environment where the echoes change as a mobile unit moves from one location to another.

Contention systems can be used for voice communications. However with such use it is difficult to provide the required service guarantee. There are hybrid schemes that assign a channel after a user successfully completes a contention protocol—for example, "demand assigned multiple access" and "movable boundary" protocols. These systems require both a contention and a circuit allocation protocol.

A third alternative, which is a variant on CSMA/CD, is the moveable slot TDM (MSTDM) protocol. In MSTDM, sources also contend for a channel and then have a guaranteed rate until they relinquish the channel. However, the MSTDM protocol is completely distributed, and the assigned channels as well as the random access packets use the same protocol to share all of the bandwidth.

In MSTDM, the notion is that there are data sources and voice sources. Data sources always use CSMA/CD. The voice sources use CSMA/CD only for the first packet of information, and use CSMA for continuation packets. A continuation packet is transmitted a fixed period after the successful transmission of the previous packet in the same packet stream. If the channel is busy (e.g., because a data source grabbed the channel a moment earlier), the continuation source waits and transmits as soon as the channel becomes available. The CSMA protocol is viable for continuation packets because the continuation voice packet includes a preempt signal at the beginning of the packet. Consequently, a data source which sees a non-busy channel, starts transmitting and then detects a collision condition can stop transmitting before it interferes with the voice source.

The length of data packets is constrained to be shorter than continuation voice packets, so that a random access packet cannot force a continuation voice packet that is waiting for the channel to collide with the next scheduled voice packet. When a continuation voice packet is delayed, all of the samples that arrive while it is waiting are included in the packet. The next packet is scheduled a standard delay after the channel is successfully acquired, rather than after the channel should have been acquired. With this protocol, voice sources never collide with each other, even when the channel utilization factor approaches one. Therefore, there is no distortion of the voice source and the only voice delay is the packet assembly time.

While the MSTDM protocol allows mobile units that transmit voice to operate mostly without the need to detect collisions, there is still some collision detection that must be carried out (for data packets and for the first voice packet). As mentioned above, however, collision detection in a wireless environment is difficult because of the echoes problem. I realized, however, that a two-channel approach can be adopted for cellular transmission which obviates the echoes problem, provides for easy detection of collisions, and provides other benefits.

Specifically, in the two-channel collision detection approach the mobile units send signals over one channel, and the base station retransmits its received signal over another channel. By performing the retransmission over a channel that is non-interfering with the channel over which the mobile units transmit to the base stations, e.g. over a different frequency, avoidance of the echo problem becomes relatively easy. What the mobile units receive over the second channel is precisely what the base station has received. The strong echoes back to a transmitting mobile unit are simply not seen on that second channel. By listening to the "busy channel" over which the base station retransmits its received signal, the mobile units can perform collision detection and stop transmitting when appropriate.

Figure 3:
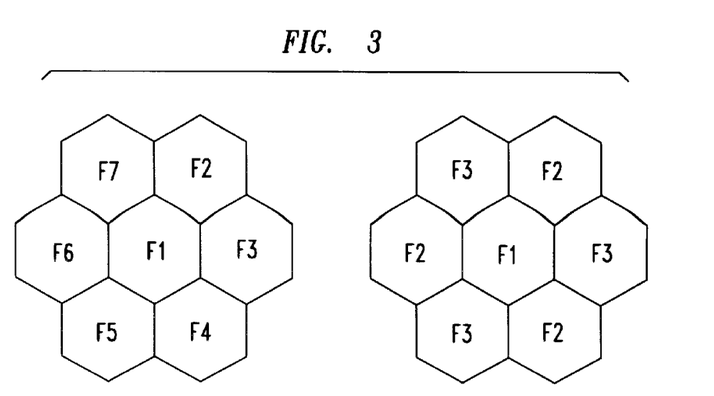
FIG. 3 shows frequency allocations for cells.

Once a two-channel approach to collision detection is settled upon, one can observe that the two-channel approach allows the mobile units to transmit signals only as far as the base station in the center of the cell, i.e., the longest distance is the radius of the cell. By comparison, when the mobile units need to listen to transmissions of other mobile units, the transmitted signal must be capable of reaching from one point on the circumference of the cell to a diametrically opposite point on the circumference of the cell. This allows for a greater re-use of frequencies. FIG. 3 shows the single-channel approach on the left, and it requires seven different frequency bands. By comparison, the two-channel approach is shown on the right, and it requires only three different frequencies. In this arrangement, all cells (hexagons) that are adjacent to a cell "A" have a different frequency from the frequency of cell "A". The frequency of cell "A" is repeated at cells whose centers are removed from the center of cell "A" by a distance of $3D\sqrt{3}/2$ distance units, where 2D is the distance between the center of cell "A" and any adjacent cell.

Figure 4:
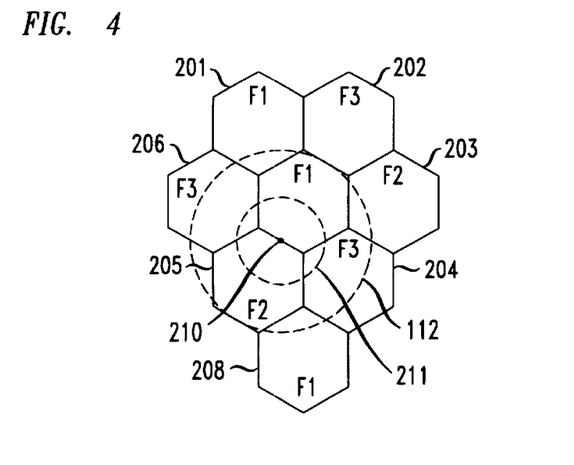
FIG. 4 shows the power considerations for transmissions by mobile units.
Figure 5:
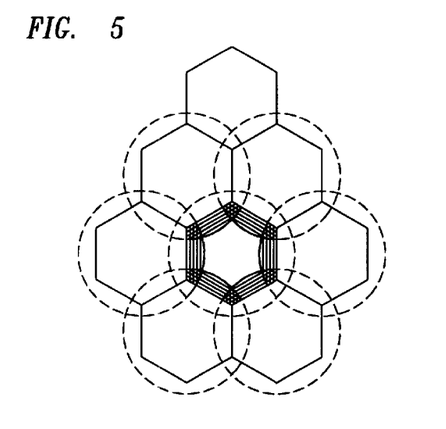
FIG. 5 depicts the cell hysteresis that is created with proper selection of base station and mobile unit transmission power.

FIG. 4 shows still another benefit of the two-channel approach. Cell 201 uses frequency F1, cells 202, 204, and 206 use frequency F2, and cells 203, 205, and 207 use frequency F3. Cell 208 re-uses frequency F1, and so the pattern repeats. A mobile unit at the edge of cell 201 and communicating with the base station at the center of cell 201 needs to transmit with only enough power to reach the center of cell 201. This is depicted by circle 211 that is centered about mobile unit 210. With that in mind, one might realize that mobile unit 210 can transmit with substantially more power before its signal would reach the center of cell 208 and interfere with the operation of that cell. Specifically, it can transmit with power that approaches the coverage of circle 212. Of course, one would not want to operate this way with no guard area, but it does suggest that both the power of the base station's transmitter and the power of the mobile units may be increased. Another way to view it is that the cell sizes may be increased while keeping their centers constant. Such an arrangement creates overlapping, non-interfering, cells, as shown in FIG. 5. The effect of allowing the size of the cells to increase is dramatic. The area that is blank within hexagon 201 of FIG. 5 is serviced by one of the three frequency assignments. The areas that are striped are serviced by two frequencies (in the group of three), and the areas that are crosshatched can use all three frequencies. In effect, the FIG. 5 arrangement represents a planned hysteresis in the cells.

Communication from the Base Station

The base station communicates with the mobile units on three levels: it transmits information from network 100, it transmits "busy channel" information (for the MSTDM protocol), and it outputs other control information over a control channel.

The outbound traffic of network 100 allows for a very simple air interface. Since the base station is the sole signal source and there is no question of collisions or interference, packets destined to a number of mobile units are assigned a frequency, queued as they arrive, and promptly transmitted over that frequency. One needs to be concerned, of course, with voice sources, where information must be sent at relatively regular intervals. That concern has been put to rest in the prior art through use of appropriate voice encoding and scheduling techniques, which can be applied herein.

The information about the channel being busy or the channel experiencing a collision can be sent over a separate channel, but it does not need to be. The base station can easily differentiate between a channel (i.e., a receiving frequency) being busy or not busy. That information can be imparted by the base station simply by transmitting information wherever the channel changes state.

Another way for the mobile units to receive the needed information is for the base station to send information at the instances when the channel becomes busy with voice packets or with data packets. Since the length of the packets is known, the intervals when the channel is not busy can be ascertained by the mobile units themselves. Thus, the information that needs to be sent by the base station over the second channel of the two-channel collision detection approach requires very little capacity.

In addition to sending information that allows the mobile units to determine when the channel is not busy, information needs to be sent whenever a collision occurs. The latter will occur fairly rarely in small cells, but it still can happen. What is important in MSTDM is to detect collision with voice packets, because transmission of continuation voice packets should not be aborted. Since data packets are aborted when a collision occurs, it is less important to detect collisions early. In fact, collision for data packets can be detected by a base station when, after the packet is received, the packet's error detection code indicates a reception error. Although some capacity in the inbound channel could have been saved by having an early detection of collision, the overall loss in capacity caused by employing a separate channel for re-transmitting to the mobile units the signal received by the base station is not called for, in light of the low probability of collisions in small cells.

As indicated above, however, it is important to detect collision between data packets and voice packets as early as possible. [This seems to contradict lines 5–11 above.] This may be achieved by incorporating a distinguishing feature in the packets themselves; e.g. a given bit is 0 for voice, and 1 for data. Alternatively, the distinguishing feature can be in the mode of transmission that is employed. For example, data packets can be transmitted by mobile units with a suppressed carrier modulation scheme, whereas voice packets can be transmitted with a non-suppressed carrier modulation scheme.

Transmitting busy/not busy/collision information in the manner described above represents a very small amount of information and, therefore, in the FIGS. 1 and 2 systems this information is injected into the channel that carries the outbound information packets. This is achieved by the base station injecting a Data Link Escape character (DLE) into the bit stream followed by two information bits, as shown by way of example in the table below.

| Bits following the DLE | Option I | Option II |
|---|---|---|
| 00 | Channel became not busy | Channel became busy with voice |
| 01 | Channel became busy | Channel became busy with data |
| 10 | A collision has occurred | A collision has occurred |

In addition to the channel that transmits outgoing information packets to the mobile units, each base station employs a common control channel for sending control information to the mobile units. Actually, since the amount of information that this channel needs to carry is not great, all base stations employ a common frequency for such transmissions. In order to avoid interference between adjacent base stations, each base station is assigned its own time slot on that frequency in such a way that base stations that might interfere with one another do not transmit at the same time. The interference between base stations using the control channel in the time domain has the same constraints as the interference in the frequency domain for communications from the base station to the mobile units. Therefore, the pattern for re-using time slots is the same as the pattern for re-using frequencies. For example, in the arrangement of FIG. 4 time is divided into three slots.

During its time slot a base station transmits a packet containing:

the base station's identity, the set of transmit and receive channels that it is using, its channel utilization, broadcast requests from switching agents that are trying to locate and activate mobile units, and the list of mobile units that are currently registered to receive packets in this cell and their allowed transmission rates (e.g., all packets or only high-priority packets).

A packet on the control channel has a maximum length that is constrained by the width of a time slot. If the complete list of registered mobile units cannot be transmitted in one packet, it is continued in the next packet, with an end-of-list identifier to indicate when the list is complete.

The power transmitted in the control channel is sufficient to guarantee that a mobile unit will always receive the signal from at least one base station, but that power is lower than the power used in the other channels. The power difference guarantees that a mobile unit can receive data from any base station from which it receives a control signal.

A mobile unit joins the list of active stations in a cell by transmitting a data packet to a base station whose signal it receives on the control channel. The base station notifies the mobile unit's switching agent that all communications with the mobile unit are to be addressed through this base station. If a mobile unit receives a control signal from several base stations, it can elect to join the base station with the lower utilization.

Mobile units are removed from the list of registered units in a cell whenever they leave the cell, stop transmitting, or become disabled. Since a mobile unit cannot always notify the base station when communication has ended, the list is maintained in the base station as soft states. When the base station does not receive a packet from a mobile unit for a period of time, the mobile unit is removed from the list of registered units.

If a registered but inactive mobile unit receives its identifier in the broadcast segment of the control slot, it means that its agent is trying to establish a connection. If an active mobile unit receives its identifier in this segment, it means that its connection has been broken. In either instance, the mobile unit sends a data packet to the base station in order to establish (or re-establish) a connection.

To summarize the air interface between a base station and mobile units, the base station has a band of frequencies that it uses to transmit information packets to mobile units within the cell. The information packets are simply queued as necessary and transmitted over the base station transmit frequencies (outbound frequencies). Corresponding to each outbound frequency there is a frequency that is used by the mobile units to transmit information packets to the base station (inbound frequency). Embedded within the stream of bits on the outbound frequency which the base station transmits are DLE sequences that inform the mobile unit of the status of the inbound frequency. In addition, the base station transmits control channel information, in a TDM fashion, over a frequency that is shared by all base stations.

The mobile units, on the other hand, employ MSTDM protocol. Each mobile unit listens before it transmits. If the DLE sequences inform a mobile unit that the inbound frequency is not busy, the mobile unit is permitted to begin transmissions. When the mobile unit wishes to transmit a data packet or a first voice packet, the mobile unit is also sensitive to collision information delivered via the DLE sequences. When a collision is detected, such a mobile unit stops transmitting and tries again later. When the mobile unit wishes to transmit continuation voice packets, it only listens for a non-busy inbound frequency before it transmits. It does not stop transmitting in case of a collision. Continuation packets include a short header that carries no information, to insure against corruption of information in case of a collision.

Overload

The FIGS. 1 and 2 arrangement does not insure against overload conditions. When a cell is heavily loaded, i.e., the inbound channel or the outbound channel is close to being fully loaded most of the time, service can be denied to a new mobile unit that wishes to become active. However, that does not prevent overload conditions because an active mobile unit can move into the heavily loaded cell and cause an overload condition.

I realized that overload conditions can be accommodated with the MSTDM protocol mostly without denying access to mobile units. It helps when all of the periodic sources use the same packet rate. Instead of treating a voice source as a single packet stream, the voice source can be partitioned into two or more periodic streams. For instance, one stream can contain the samples that are needed for intelligible communications, while the second stream can contain the samples that provide a higher quality connection. Normally, a mobile unit acquires two periodic channels and sends both packet streams. However, during an overload the mobile unit can be instructed to only send one stream. The control channel provides the mechanism for notifying the mobile units of how many voice streams they may transmit. Of course, capacity in a cell can also be increased for voice transmissions by asking the mobile units to transmit only during the active speech intervals in a TASI type of operation. TASI does tend to cut off a beginning portion of an active speech interval. In this mode, therefore, when there are more active speakers than available capacity, the beginning of active intervals may be lost.

Another way to handle overload is to take advantage of the hysterisis in the cells. As shown in FIG. 5, there can be substantial areas within each cell that can be serviced by one or two other adjacent cells. Taking advantage of this hysteresis is applicable to both overload from active mobile units that come in (and stay) in the cell as well as overload from inactive units wishing to become active. The mobile unit selects the base station with the strongest signal, which is not over-utilized, and directs its packets to its switching agent via the selected base station. The switching agent detects the identity of the base station from which the packets come and accordingly adjusts the address of the packets which the base station transmits when it wants to communicate information to the mobile unit.

A combination of the above techniques is also possible. The primary base station may constrain the mobile unit to send only packets that are needed for comprehensive speech, and the mobile unit may still be able to transmit the packets that can be used for higher quality through another base station. In this instance, some of the packets would arrive at the mobile unit's switching agent through one base station and the remainder of the packets would arrive at the mobile unit's switching agent through another base station. The packets include a sequence number, if necessary, and the agent is responsible for properly sequencing and spacing the packets.

During severe overload, a protocol is needed to redistribute mobile units. A hybrid protocol that couples independent operations of the mobile units with the cooperative operations of the base stations provides a means to be both responsive to short term fluctuations and to level load imbalances over a large area. The mobile unit can quickly shift its own load between overlapping cells, while base stations must cooperate to redistribute the load over a wider area.

The protocol to move mobile units can use different types of information. A simple protocol could allow a heavily utilized base station to use the control channel to move some mobile units to overlapping, less heavily utilized cells. The base stations in the adjacent cells could then move other mobile units to cells that are further from the congested cell, making it possible for the congested cell to move more units. In a more sophisticated protocol, a base station could take into account the number of units that adjacent cells can redistribute and any other congested regions that may be near the adjacent cells.

With packet switching there is a possibility that packets arrive out of order and that the inter-packet timing will not be maintained, especially as a mobile unit changes base stations. To overcome this potential problem, the packets in the arrangement disclosed herein contain a sequence number and timing information so that the switching agent can accurately reconstruct the signal before transmitting it to the switched network. The RTP protocol, used on the Internet, includes the necessary information.

Figure 6:
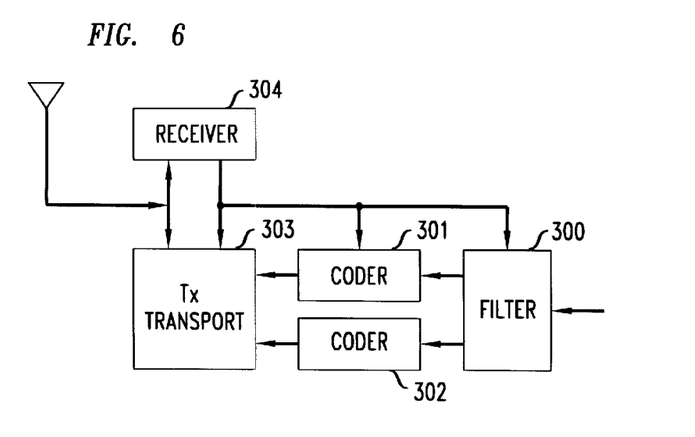
FIG. 6 illustrates a portion of a mobile unit's structure that allows graceful degradation in case of overload conditions at a base station.

FIG. 6 presents a general block diagram showing those portions of a mobile unit that provide the capability to transmit packets as described above. Receiver 304 receives signals from the base station and derives from the control channel information about overload. This information is applied to filter 300, coder 301, and transmitter 303. The voice signals are applied to filter 300, and appropriate signals are developed at the output of filter 300 and applied to coders 301 and 302. Specifically, when a no-overload condition is indicated, coder 301 receives the applied voice signal, and coder 301 develops a stream of packets corresponding to the applied voice signal. When an overload condition is indicated, coder 301 receives only a portion of the voice signal that is needed for intelligibility, and coder 301 develops a stream of packets at a rate that is lower than the rate developed for a no-overload condition. In system applications where a mobile unit is directed to send some of its voice packets to a different base station (when there is an overload at the base station with which the mobile unit is communicating), transmitter 303 utilizes the output packet stream of coder 302. Accordingly, coder 302 is adapted to provide a packet stream in response to a signal that is developed by filter 300. The signal developed by filter 300 and applied to coder 302 is that portion of the applied voice signal that complements the signal applied to coder 301 when an overload condition exists. Illustratively, under normal conditions, filter 300 merely applies its incoming speech signal to coder 301. When a control signal directs modified operation, filter 300 separates the voice signal into a primary band and a secondary band. Both are shifted to base-band, and then applied to coders 301 and 302.

It may be noted that the overlap depicted in FIG. 5, which provides for cell hysteresis can be employed to advantage in more than just overload situations. For example, cell hysteresis eliminates the sometimes-occurring glitch in speech that comes about from cell switching in the middle of an active speech interval. Cell hysteresis allows a moving mobile unit to stay in contact with the base station of the cell it has temporarily left, so that when the moving unit returns to the cell, the process of moving to a different base station and returning to the original base station is eliminated. Lastly, cell hysteresis reduces the surface area that loses service when a base station fails.

The Switching Agent

The switching agent must translate between the data format that is used on network 100 and the packet format. For example, when network 100 carries speech in 64 Kbps (i.e., 8 bit samples are transmitted at the rate of 8000 samples per second) and the packets carry 20 msec of speech each, the switching agent needs to assemble 20 msec worth of speech from network 100 in order to create a voice packet. In the other direction, the switching agent needs to take the 20 msec of speech delivered by a packet, create samples, and evenly transmit them to network 100.

The switching agent also keeps track of the base station that can transmit to its mobile unit. As a mobile unit moves from cell to cell it notifies its agent. When an agent must locate an inactive mobile unit, to place a phone call or to locate an active unit that has lost contact, it broadcasts a message to all of the base stations which is placed on their control channels. The hailed mobile unit responds and thereby informs its switching agents of its whereabouts.

The switching agent also maintains a connection on network 100 on behalf of the mobile unit. The agent breaks the connection at the end of a communication session or when a failure occurs. Since the switching agent is not always notified of a failure, it maintains a soft state connection so that resources in network 100 are not tied up indefinitely. If the switching agent stops receiving packets for a period of time, it first tries to contact the last base station, and then tries a broadcast message to the mobile unit. If communication with the mobile unit cannot be re-established, the connection on network 100 is terminated.

For sake of completeness, it should be mentioned that the FIGS. 1 and 2 arrangements do not, in and of themselves, overcome the well-known privacy problem of cellular telephony. Packets that are addressed to one mobile unit can be detected by another mobile unit. The advantage of the packet system is that the data is digital and can be encrypted or scrambled more easily. In other words, the privacy problem is easily overcome with the disclosed system by employing known encryption techniques, such as the one disclosed by Reeds et al in U.S. Pat. No. 5,172,414, issued Dec. 15, 1992.

I claim:

1. A method for operating a cellular system comprising a base station that receives voice packets representing speech of a given fidelity from at least one of a plurality of mobile units that transmits the voice packets to the base station, comprising the steps of:

said base station determining an overload condition on an inbound frequency over which mobile units transmit said voice packets to the base station, and in response to a determination of an overload condition, the base station directing said at least one mobile unit to transmit voice packets that correspond to a portion of said speech, which portion corresponds to speech that is intelligible but with a fidelity that is lower than said given fidelity.

2. The method of claim 1 where packets that correspond to a complementing portion of said voice signal that is missing from said portion of said speech are directed by the base station to be transmitted by said at least one mobile unit to a different base station.

3. The method of claim 1 where said voice packets transmitted by said one of said at least one mobile unit correspond to an encoded portion of said speech.

4. The method of claim 1 where said voice packets transmitted by said one of said at least one mobile unit correspond to a filtered portion of said speech.

5. The method of claim 1 further comprising a step, responsive to said step of directing, of creating said portion of said speech signal, and creating voice packets based on said portion of said speech signal.

6. The method of claim 5 where said step of creating a portion comprises a step of separating said speech into said portion and a remainder.

7. The method of claim 1 where said voice packets are explicitly addressed.

* * * * *